US009639975B1

(12) United States Patent
King et al.

(10) Patent No.: US 9,639,975 B1
(45) Date of Patent: May 2, 2017

(54) SYSTEM AND METHOD FOR GENERATING SHADOWS

(75) Inventors: Christopher M. King, Berkeley, CA (US); Apurva Shah, San Mateo, CA (US)

(73) Assignee: Pixar, Emeryville, CA (US)

( * ) Notice: Subject to any disclaimer, the term of this patent is extended or adjusted under 35 U.S.C. 154(b) by 1883 days.

(21) Appl. No.: 12/909,792

(22) Filed: Oct. 21, 2010

(51) Int. Cl.
*G06T 15/60* (2006.01)
*G06T 15/06* (2011.01)
*G06T 15/00* (2011.01)
*G06T 15/04* (2011.01)

(52) U.S. Cl.
CPC .............. *G06T 15/60* (2013.01); *G06T 15/00* (2013.01); *G06T 15/04* (2013.01); *G06T 15/06* (2013.01); *G06T 2215/12* (2013.01)

(58) Field of Classification Search
CPC ....... G06T 15/06; G06T 15/506; G06T 15/55; G06T 15/50; G06T 15/40; G06T 15/205
See application file for complete search history.

(56) References Cited

U.S. PATENT DOCUMENTS

| | | | | |
|---|---|---|---|---|
| 5,488,700 | A * | 1/1996 | Glassner | 345/426 |
| 9,001,124 | B2 * | 4/2015 | Engel | G06T 15/08 345/426 |
| 2008/0174600 | A1 * | 7/2008 | Xie | 345/426 |

OTHER PUBLICATIONS

Turner Whitted, "An Improved Illumination Model for Shaded Display", Jun. 1980, ACM, Graphics and Image Processing, Communications of the ACM, vol. 23, No. 6, pp. 343-349.*
Daniel Aliaga, et al. "MMR: An Interactive Massive Model Rendering System Using Geometric and Image-Based Acceleration", 1999, ACM, Symposium on Interactive 3D Graphics.*
Robert L. Cook, Thomas Porter, Loren Carpenter, "Distributed Ray Tracing", Jul. 1984, ACM, Computer Graphics, vol. 18, No. 3, pp. 137-145.*
Mikio Shinya, Tokiichiro Takahashi, Seiichiro Naito, "Principles and Applications of Pencil Tracing", Jul. 1987, ACM, Computer Graphics, vol. 21, No. 4, pp. 45-54.*
Robert L. Cook, "Stochastic Sampling in Computer Graphics", Jan. 1986, ACM, ACM Transactions on Graphics, vol. 5, No. 1, pp. 51-72.*
Tobias Ritschel, Thorsten Grosch, and Hans-Peter Seidel, "Approximating Dynamic Global Illumination in Image Space", Mar. 1, 2009, ACM, Proceedings of the 2009 symposium on Interactive 3D graphics and games, pp. 75-82.*
Paul S. Heckbert, Pat Hanrahan, "Beam Tracing Polygonal Objects", Jul. 1984, ACM, ACM SIGGRAPH Computer Graphics, vol. 18, Issue 3, pp. 119-127.*
Gregory J. Ward, Francis M. Rubinstein, Robert D. Clear, "A Ray Tracing Solution for Diffuse Interreflection", Aug. 1988, ACM, ACM SIGGRAPH Computer Graphics, vol. 22, Issue 4, pp. 85-92.*

* cited by examiner

*Primary Examiner* — Robert Bader
(74) *Attorney, Agent, or Firm* — Patterson + Sheridan, LLP

(57) ABSTRACT

A computer-implemented method for generating a shadow in a graphics scene. The method includes casting a ray having a finite length associated with a point on a surface of an object in the graphics scene towards a light source; determining whether the ray intersects any other objects in the graphics scene; and generating a shadow value associated with the point on the surface of the object based on a combination of geometric scene information obtained as a result of determining whether the ray intersects any other objects in the graphics scene and an image-based shadow map value.

23 Claims, 4 Drawing Sheets

SYSTEM AND METHOD FOR GENERATING SHADOWS

BACKGROUND

Field of the Invention

The present invention relates to the field of computer graphics and, in particular, to a system and method system and method for generating shadows.

Description of the Related Art

A wide variety of techniques exist for rendering shadows in a graphics scene. As with many computer graphics concepts, the goal of shadow rendering techniques is to generate shadows that appear as natural and physically accurate as possible. For example, in a real-world physical shadow, the shadow is sharp near objects that occlude the light, and become softer as the distance to the occluding object increases.

One technique for generating shadows involves ray tracing. One problem with ray tracing is that, if a "soft" ray traced shadow is called for (i.e., with blurry edges), many samples have to be used to cover a wide cone. Such an approach can quickly become very computationally expensive.

Another technique for generating shadows involves image-based shadow maps. Using this technique, shadows are created by determining whether a pixel is visible from the light source by comparing the pixel to a depth buffer of the view of the light source. This technique provides good shapes for the shadows, but the blur of shadows is unaffected by the distance to the occluding object. However, in order to achieve a lot of fine detail in shadow maps, large maps must be rendered. Also, adjusting the bias to avoid self-shadowing can be complex and time consuming.

As the foregoing illustrates, there is a need in the art for an improved technique that addresses the limitations of current approaches set forth above.

SUMMARY

Embodiments of the invention relate to a technique for generating shadows. In one embodiment, a number of finite length rays is cast from a surface point. If a ray intersects an object, then the surface point is determined to be in shadow using ray tracing. If a ray does not hit any objects, then embodiments look up into a shadow map from the end of the ray to calculate occlusion. Multiple samples may be made at the surface point. Each sample, whether directly ray traced or from the shadow map, is averaged. Some embodiments also calculate a cone angle for the ray tracing to match the shadow map blur. In addition, multi-sampling helps smooth the transition from ray tracing to shadow maps. Also, by doing the shadow map look up from the end of the ray, embodiments effectively achieve a large bias, so self-shadowing is not as much of an issue and the shadow stays sharp near the occluders.

One embodiment of the invention provides a computer-implemented method for generating a shadow in a graphics scene. The method includes casting a ray having a finite length associated with a point on a surface of an object in the graphics scene towards a light source; determining whether the ray intersects any other objects in the graphics scene; and generating a shadow value associated with the point on the surface of the object based on a combination of geometric scene information obtained as a result of determining whether the ray intersects any other objects in the graphics scene and an image-based shadow map value.

One advantage is that embodiments of the invention is that realistic shadows can be generated with relatively less computational resources that using conventional techniques.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments of the invention relate to a technique for generating shadows. In one embodiment, a number of finite length rays is cast from a surface point. If a ray intersects an object, then the surface point is determined to be in shadow using ray tracing. If a ray does not hit any objects, then embodiments look up into a shadow map from the end of the ray to calculate occlusion. Multiple samples may be made at the surface point. Each sample, whether ray traced or from the shadow map, is averaged. Some embodiments also calculate a cone angle for the ray tracing to match the shadow map blur. In addition, multi-sampling helps smooth the transition from ray tracing to shadow maps. Also, by doing the shadow map look up from the end of the ray, embodiments effectively achieve a large bias, so self-shadowing is not as much of an issue and the shadow stays sharp near the occluders.

One embodiment of the invention provides a computer-implemented method for generating a shadow in a graphics scene. The method includes casting a ray having a finite length associated with a point on a surface of an object in the graphics scene towards a light source; determining whether the ray intersects any other objects in the graphics scene; and generating a shadow value associated with the point on the surface of the object based on a combination of geometric scene information obtained as a result of determining whether the ray intersects any other objects in the graphics scene and an image-based shadow map value.

Hardware Overview

Figure 1:
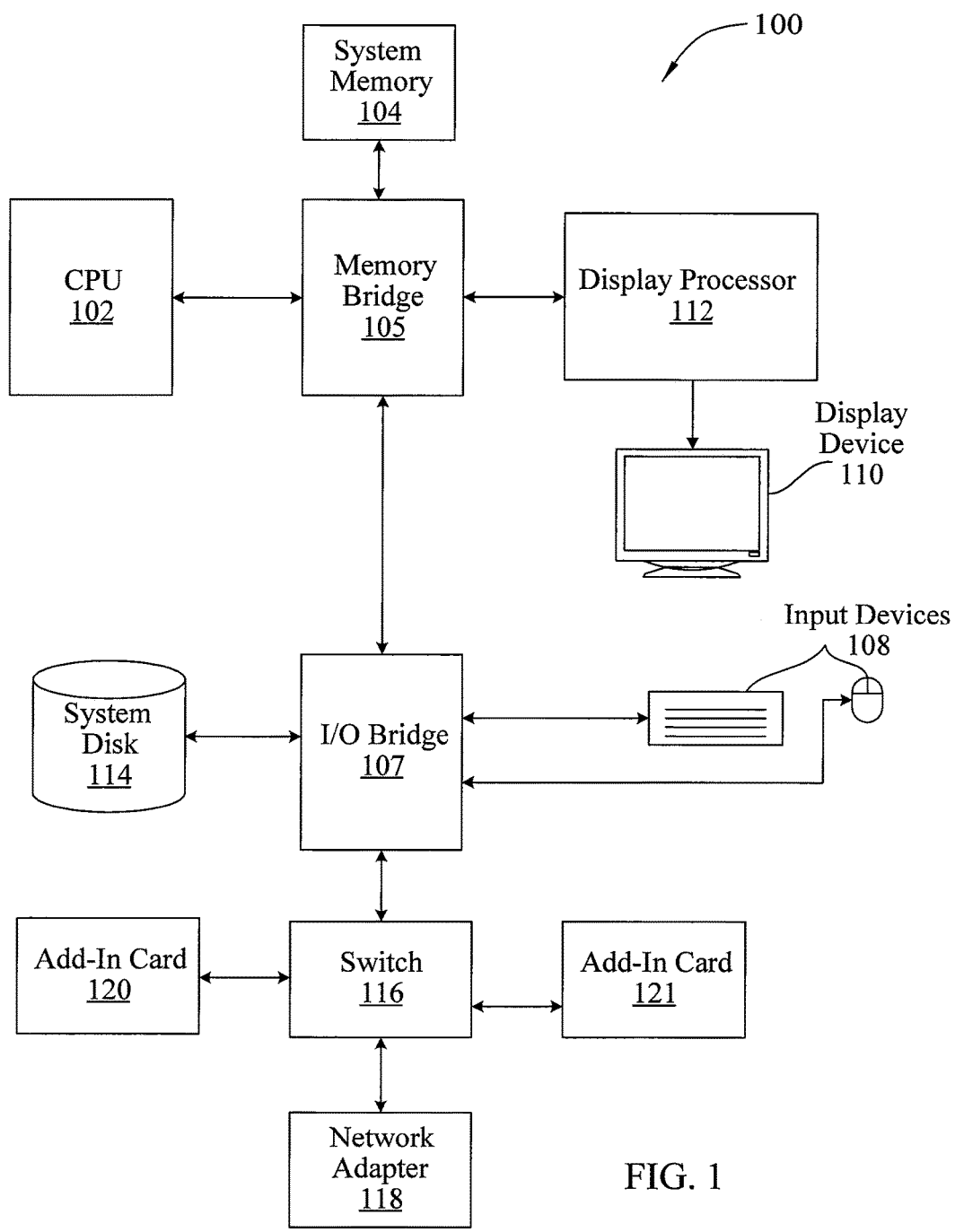
FIG. 1 is a block diagram of a system configured to implement one or more aspects of the invention.

FIG. 1 depicts one architecture of a system 100 within which embodiments of the present invention may be implemented. This figure in no way limits or is intended to limit the scope of the present invention.

System 100 may be a personal computer, video game console, personal digital assistant, rendering engine, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scan-line rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Shadow Generation Technique

Figure 2A:
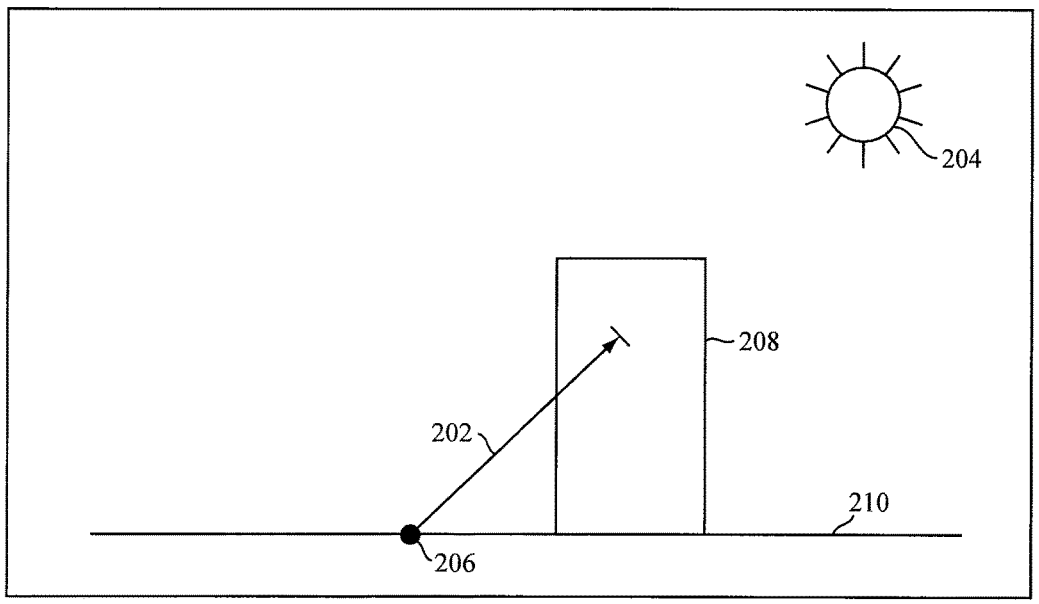
FIGS. 2A-2B are conceptual diagrams illustrating casting a finite length ray towards a light source, according to some embodiments of the invention.
Figure 2B:
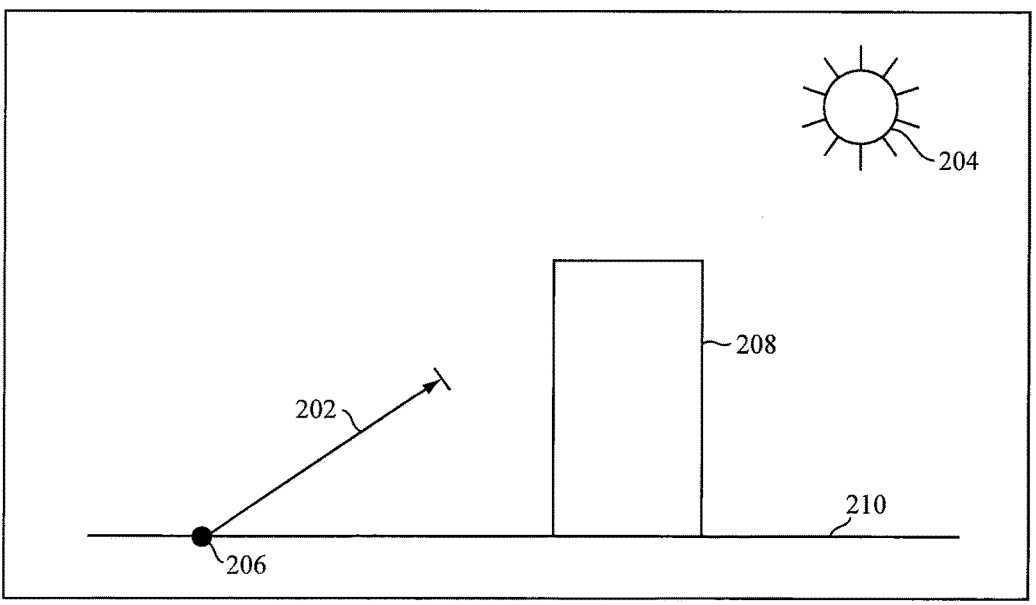

FIGS. 2A-2B are conceptual diagrams illustrating casting a finite length ray 202 towards a light source 204, according to various embodiments of the invention. As shown in FIG.

2A, the ray 202 originates from a point 206 on a surface 210 of an object. The ray 202 is cast towards the light source 204 with a finite length. In some embodiments, the length of the ray 202 is user-configurable. By implementing a finite-length ray, embodiments of the invention provide a relatively computationally inexpensive approach to ray tracing, compared to using typical ray tracing shadowing techniques, since the finite length ray minimizes the geometry that the algorithm checks against for intersections.

As shown in FIG. 2A, when the ray 202 intersects an object 208, embodiments of the invention determine that the point 206 is in shadow. However, as shown in FIG. 2B, when the ray 202 does not intersect any objects, then embodiments of the invention look up in the shadow map to determine whether there are any other objects that are casting a shadow from further away.

Figure 3:
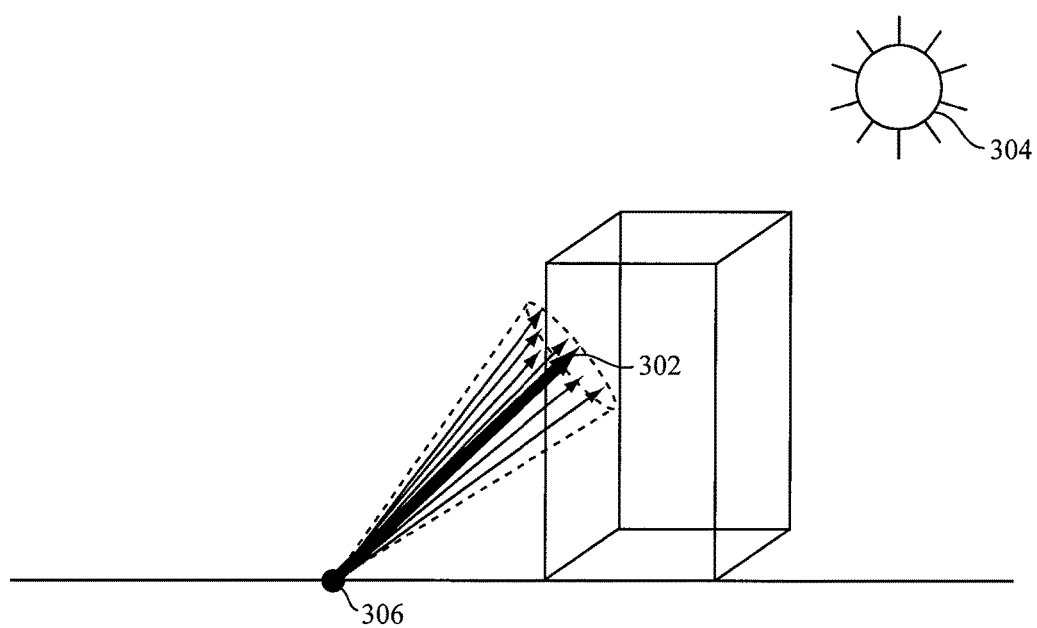
FIG. 3 is conceptual diagram illustrating casting multiple rays within a cone angle of a central ray towards a light source, according to one embodiment of the invention.

Some embodiments of the invention provide for generating "n" number of sample rays that originate from the same point on the surface and aggregating them to generate the shadow. FIG. 3 is conceptual diagram illustrating casting multiple rays within a cone angle of a central ray 302 towards a light source 304, according to one embodiment of the invention. As shown the central ray 302, having a finite length, is cast from a point 306. Additional rays are also cast from the point 306 with an angle within a threshold amount of degrees from the angle associated with the central ray 302. In some embodiments, the length of each of the different additional rays may be also be varied. For example, the angle of each additional ray and/or the length of each additional ray may be determined using a stochastic sampling. In another example, the distribution of rays from the central ray 302 may be based on a Guassian fall-off function. In scenes with multiple light sources, the algorithm may be repeated separately for each light source.

In some embodiments, the shadow map is blurred by a certain radius. The length of the central ray 302 and or the cone angle of the other rays may be user-configurable to set the distance at which a transition occurs from ray traced shadows to shadow mapping. These parameters may also be used to align the transition to account for the shape difference between a ray-traced shadow and a shadow-mapped shadow.

In some embodiments, additional parameters may be used to account for glancing angles. Glancing angles occur when the angle between a vector from the point being shaded to the light source is nearly parallel to the surface. In such a case, the shadows tend be longer than when the light source is more overhead. In some embodiments, the finite length ray that is cast towards the light source originates at a location that is biased or offset from the surface of an object. This feature is also referred to a "grow," and is used, in some embodiments, to avoid or minimize self-shadowing. In some embodiments, the bias of a surface point is based on the angle towards the light source. For example, the bias increases as the angle between a vector from the point being shaded to the light source approaches being parallel to the surface. To determine whether a point on a surface corresponds to a glancing angle, a processor may compare the surface normal to the direction of the light source. Then, the processor sets the bias based on the detected angle, as described above. The ray is then cast towards the light source, originating at a location biased from the surface of the object being shaded.

Figure 4:
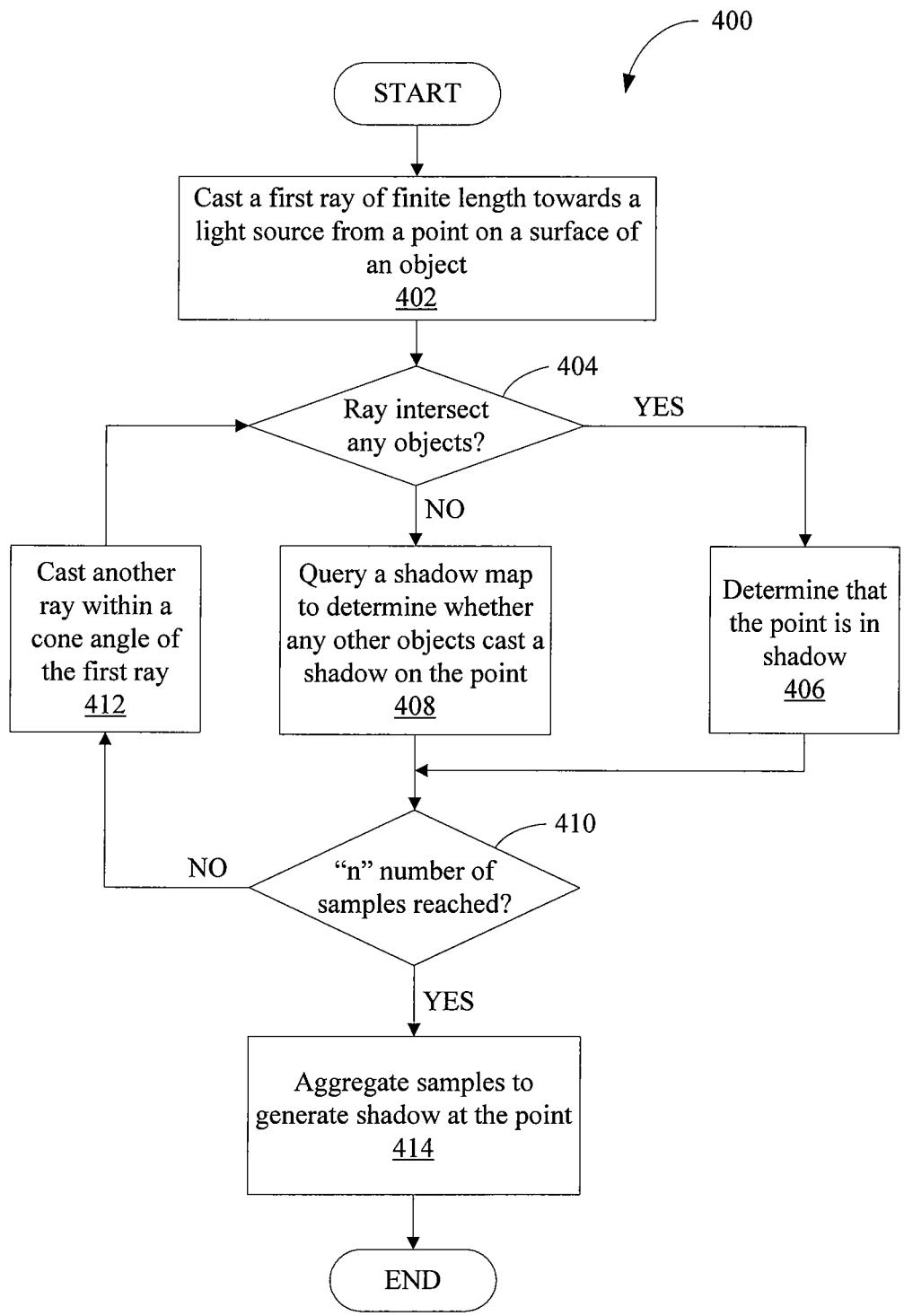
FIG. 4 is a flow diagram of method steps for generating shadows, according to one embodiment of the invention.

FIG. 4 is a flow diagram of method steps for generating shadows, according to one embodiment of the invention. Persons skilled in the art will understand that, even though the method 400 is described in conjunction with the systems of FIGS. 1-3, any system configured to perform the method steps, in any order, is within the scope of embodiments of the invention.

As shown, the method 400 begins at step 402, where a software application, such as a rendering application executed by a processor, casts a first ray having a finite length towards a light source from a point on a surface of an object. As described, by casting a ray having finite length, instead of having infinite length as is done in conventional ray tracing, the computational complexity of the disclosed technique is decreased. In some embodiments, the finite length comprises a length that is less than a distance between the point on the surface of the object and the light source.

At step 404, the software application determines whether the finite length ray intersects any objects. If the software application determines that the ray does intersect an object, then the method 400 proceeds to step 406. At step 406, the software application determines that the point is in shadow. In some embodiments, the shadow at the point is determined to be a crisp or sharp shadow. The shadow value at step 406 is, in some embodiments, based on the geometric scene information obtained from the ray trace (i.e., based on whether the ray intersected any objects). If, at step 404, the software application determines that the finite length ray does not intersect any objects, then the method 400 proceeds to step 408.

At step 408, the software application queries a shadow map to determine the shadowing of the point based on whether any other objects cast a shadow on the point from further away. In some embodiments, the shadow at the point is determined to be a soft or blurry shadow. In some embodiments, a blurry shadow is one where the transition between being in shadow and out of shadow is smoothed over a particular distance. In some instances, the border between areas of the image that are in shadow and areas that are not in shadow is wide and indistinct. A sharp shadow, on the other hand, is one where the transition between being in shadow and out of shadow happens over a short distance (relative to the blurry shadow).

In some embodiments, generating a shadow value associated with the point on the surface of the object is based on a combination of (i) geometric scene information obtained as a result of determining whether the ray intersects any other objects in the graphics scene, i.e., step 406, and (ii) an image-based shadow map value, i.e., step 408. In some embodiments, the combination is based on at least one of a distance at which the ray intersects another object in the graphics scene and an opacity of the object intersected by the ray. Also, in some embodiments, the combination comprises a weighted combination of the geometric scene information and the image-based shadow map value. For example, the geometric scene information could have unit weight in the combination and the image-based shadow map value could have zero weight in the combination. In another example, the geometric scene information could have zero weight in the combination and the image-based shadow map value could have unit weight in the combination.

At step 410, the software application determines whether "n" number of samples have been analyzed for the point. As described above, multiple sample rays may be cast from the point on the surface towards the light source. The cone angle relative to a central ray may be configurable by the user. Also, each of the multiple rays may have varying lengths, with a threshold. In some embodiments, the distribution of rays is based on a stochastic sample. In other embodiments, the distribution of rays is based on a Gaussian fall-off.

If, at step 410, the software application determines that "n" number of samples has not yet been analyzed for the point, then the method proceeds to step 412. The value of "n" may be configurable by the user, e.g., 32 samples. At step 412, the software application casts another ray towards the light source. As described, the additional ray may be cast at a different angle and having a different length. From step 412, the method 400 proceeds to step 404, described above.

If, at step 410, the software application determines that "n" number of samples have been analyzed for the point, then the method proceeds to step 414. At step 414, the software application aggregates the samples to generate a shadow associated with the point. In some embodiments, the aggregation is an averaging operation. For example, "n" may be equal to 32 samples, where 24 of the rays cast from the point intersect an object and 8 rays do not intersect any objects. Accordingly, the shadow at the point may comprise 75% crisp shadow, i.e., from the finite-length ray casting technique, and 25% soft shadow from the shadow mapping technique. In other embodiments, the aggregation of the samples may comprise a weighted average or any other technically feasible aggregation technique.

In sum, embodiments of the invention relate to a technique for generating shadows. In one embodiment, a number of short rays is cast from a surface point. If a ray intersects an object, then the surface point is determined to be in shadow using ray tracing. If a ray does not hit any objects, then embodiments look up into a shadow map from the end of the ray to calculate occlusion. Multiple samples may be made at the surface point. Each sample, whether ray traced or from the shadow map, is averaged. Some embodiments also calculate a cone angle for the ray tracing to match the shadow map blur. In addition, multi-sampling helps smooth the transition from ray tracing to shadow maps. Also, by doing the shadow map look up from the end of the ray, embodiments effectively achieve a large bias, so self-shadowing is not as much of an issue and the shadow stays sharp near the occluders.

One advantage is that embodiments of the invention is that realistic shadows can be generated with relatively less computational resources that using conventional techniques.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for generating a shadow in a graphics scene, the method comprising:
   casting, using a processor, a ray having a pre-determined finite length associated with a point on a surface of an object in the graphics scene towards a light source;
   determining whether the ray intersects any other objects in the graphics scene;
   generating a shadow value associated with the point on the surface of the object based on a combination of geometric scene information obtained as a result of determining whether the ray intersects any other objects in the graphics scene and an image-based shadow map value; and
   casting a plurality of additional rays associated with the point on the surface towards the light source, wherein each ray in the plurality of additional rays is associated with an angle that is within a cone angle associated with the ray, wherein each ray in the plurality of additional rays has a length that is within a range of the finite length of the ray, wherein the additional ray lengths are determined using a stochastic sampling.

2. The method of claim 1, wherein the finite length comprises a length that is less than a distance between the point on the surface of the object and the light source.

3. The method of claim 1, wherein the combination is based on at least one of a distance at which the ray intersects another object in the graphics scene and an opacity of the object intersected by the ray.

4. The method of claim 1, wherein the geometric scene information has unit weight in the combination and the image-based shadow map value has zero weight in the combination.

5. The method of claim 1, wherein the geometric scene information has zero weight in the combination and the image-based shadow map value has unit weight in the combination.

6. The method of claim 1, further comprising determining, for each ray in the plurality of additional rays, whether the ray intersects any other objects in the graphics scene, and generating, for each ray in the plurality of additional rays, a shadow value associated with the point on the surface of the object.

7. The method of claim 6, further comprising aggregating the shadow values associated with the rays in the plurality of additional rays to generate an output shadow value.

8. The method of claim 7, wherein aggregating the shadow values comprises averaging the shadow values.

9. The method of claim 8, wherein averaging the shadow values comprises computing a weighted average.

10. The method of claim 1, wherein the angle associated with each ray in the plurality of additional rays is based on a stochastic sampling or a Gaussian function.

11. The method of claim 1, further comprising:
    determining an angle between the ray and a surface normal at the point on the surface of the object; and
    calculating an offset value from the point on the surface of the object based on the angle, wherein the ray originates from a location biased from the point on the surface of the object by the offset value.

12. A non-transitory computer-readable storage medium storing instructions that, when executed by a processor, cause a computer system to generate a shadow in a graphics scene, by performing the steps of:
    casting a ray having a pre-determined finite length associated with a point on a surface of an object in the graphics scene towards a light source;

determining whether the ray intersects any other objects in the graphics scene;

generating a shadow value associated with the point on the surface of the object based on a combination of geometric scene information obtained as a result of determining whether the ray intersects any other objects in the graphics scene and an image-based shadow map value; and casting a plurality of additional rays associated with the point on the surface towards the light source, wherein each ray in the plurality of additional rays is associated with an angle that is within a cone angle associated with the ray, wherein each ray in the plurality of additional rays has a length that is within a range of the finite length of the ray, wherein the additional ray lengths are determined using a stochastic sampling.

13. The computer-readable storage medium of claim 12, wherein the finite length comprises a length that is less than a distance between the point on the surface of the object and the light source.

14. The computer-readable storage medium of claim 12, wherein the combination is based on at least one of a distance at which the ray intersects another object in the graphics scene and an opacity of the object intersected by the ray.

15. The computer-readable storage medium of claim 12, wherein the geometric scene information has unit weight in the combination and the image-based shadow map value has zero weight in the combination.

16. The computer-readable storage medium of claim 12, wherein the geometric scene information has zero weight in the combination and the image-based shadow map value has unit weight in the combination.

17. The computer-readable storage medium of claim 12, further comprising determining, for each ray in the plurality of additional rays, whether the ray intersects any other objects in the graphics scene, and generating, for each ray in the plurality of additional rays, a shadow value associated with the point on the surface of the object.

18. The computer-readable storage medium of claim 17, further comprising aggregating the shadow values associated with the rays in the plurality of additional rays to generate an output shadow value.

19. The computer-readable storage medium of claim 18, wherein aggregating the shadow values comprises averaging the shadow values.

20. The computer-readable storage medium of claim 19, wherein averaging the shadow values comprises computing a weighted average.

21. The computer-readable storage medium of claim 12, wherein the angle associated with each ray in the plurality of additional rays is based on a stochastic sampling or a Gaussian function.

22. The computer-readable storage medium of claim 12, further comprising:

determining an angle between the ray and a surface normal at the point on the surface of the object; and calculating an offset value from the point on the surface of the object based on the angle, wherein the ray originates from a location biased from the point on the surface of the object by the offset value.

23. A computer system, comprising:

a processor; and a memory storing instructions that, when executed by the processor, cause the computer system to generate a shadow in a graphics scene by:

casting a ray having a pre-determined finite length associated with a point on a surface of an object in the graphics scene towards a light source, determining whether the ray intersects any other objects in the graphics scene, generating a shadow value associated with the point on the surface of the object based on a combination of geometric scene information obtained as a result of determining whether the ray intersects any other objects in the graphics scene and an image-based shadow map value; and casting a plurality of additional rays associated with the point on the surface towards the light source, wherein each ray in the plurality of additional rays is associated with an angle that is within a cone angle associated with the ray, wherein each ray in the plurality of additional rays has a length that is within a range of the finite length of the ray, wherein the additional ray lengths are determined using a stochastic sampling.

* * * * *